United States Patent
Cova et al.

(10) Patent No.: US 7,596,248 B2
(45) Date of Patent: Sep. 29, 2009

(54) METHOD FOR IDENTIFICATION OF PERSON BY RECOGNITION OF A DIGITAL FINGERPRINT

(75) Inventors: Jean-François Cova, Paris (FR); Frédéric Chevalier, Verneuil sur Seine (FR)

(73) Assignee: SAGEM Sécurité (FR)

(*) Notice: Subject to any disclaimer, the term of this patent is extended or adjusted under 35 U.S.C. 154(b) by 936 days.

(21) Appl. No.: 10/533,964

(22) PCT Filed: Nov. 3, 2003

(86) PCT No.: PCT/FR03/03271

§ 371 (c)(1),
(2), (4) Date: May 4, 2005

(87) PCT Pub. No.: WO2004/044826

PCT Pub. Date: May 27, 2004

(65) Prior Publication Data

US 2006/0107066 A1  May 18, 2006

(30) Foreign Application Priority Data

Nov. 8, 2002 (FR) .................................. 02 14030

(51) Int. Cl.
*G06K 9/00* (2006.01)
(52) U.S. Cl. .................. 382/124; 382/100; 382/125; 382/254; 382/276
(58) Field of Classification Search .................. 382/115, 382/124–127
See application file for complete search history.

(56) References Cited

U.S. PATENT DOCUMENTS

| 5,703,958 | A | * | 12/1997 | Hara | 382/124 |
| 5,926,555 | A | * | 7/1999 | Ort et al. | 382/124 |
| 6,038,332 | A | * | 3/2000 | Fishbine et al. | 382/115 |
| 6,324,297 | B1 | | 11/2001 | Uchida | |
| 2002/0050713 | A1 | * | 5/2002 | Bergenek et al. | 283/68 |
| 2002/0126883 | A1 | * | 9/2002 | Senior | 382/125 |

FOREIGN PATENT DOCUMENTS

| EP | 0 617 919 | 10/1994 |
| EP | 617919 A2 * | 10/1994 |

* cited by examiner

Primary Examiner—Matthew C Bella
Assistant Examiner—Eric Rush
(74) Attorney, Agent, or Firm—Stites & Harbison PLLC; Marvin Petry

(57) ABSTRACT

The invention relates to a method for identification of a person by recognition of a digital fingerprint, whereby the characteristic points on a digitized image of a digital fingerprint (E) are determined and transmitted (16) to a bank holding (17) the characteristic points of a number of digital fingerprints for comparison and identification (18) of the person to whom the photographed fingerprint belongs. When the fingerprint (E) is taken on a curved surface (3) of an object (12), the digitised mage is transformed (13) into a plane-projection corrected digitised image, by means of an algorithm, in which the characteristic points are detected (15).

4 Claims, 3 Drawing Sheets

METHOD FOR IDENTIFICATION OF PERSON BY RECOGNITION OF A DIGITAL FINGERPRINT

The present invention relates in general to the field of identifying a person by fingerprint/toeprint recognition and relates more specifically to improvements made to automated methods of identifying a person by fingerprint/toeprint recognition, consisting in:

producing a digital photograph giving a digitized image of a fingerprint/toeprint or part of a fingerprint/toeprint present on a surface of an object;

analyzing said digitized image of the fingerprint/toeprint;

detecting characteristic points therein;

exchanging the digital data of the detected characteristic points with a data bank storing digital data of the characteristic points of a multiplicity of fingerprints/toeprints in its memory, said stored digital data corresponding to plane images of the multiplicity of fingerprints/toeprints;

comparing the digital data of the abovementioned detected characteristic points with the digital data stored in the memory of the data bank; and identifying a person possessing said fingerprint/toeprint as a result of the above comparison.

In what follows, the invention will be discussed and explained with reference to fingerprints/toeprints, that is to say to the skin ridges present on the undersides of one's fingers and toes (generally the fingers). However, it should be understood that the invention applies not only to fingerprints/toeprints (from the fingers of one's hands or the toes of one's feet) but also to prints of other skin ridges that are present on other parts of the body (for example the palms of one's hands, the soles of one's feet, etc.).

Such methods are used for automated identification of a person from a fingerprint/toeprint detected on a surface of an object.

When said surface is plane or approximately plane (for example a curved surface with a large radius of curvature), the digitized image of the fingerprint/toeprint provided by digital photography reproduces, in a substantially correct and full manner, the topology of the characteristic points of said print and the identification process explained above may be performed reliably.

However, in many cases, fingerprints may be detected on curved surfaces of relatively small radius of curvature (for example the handle of a tool, the case of a munition, the barrel of a firearm, a door handle, etc.). In this case, the central part—located on that part of the surface which is closest to the photographic objective and which extends approximately transverse to the axis of the latter—of the fingerprint/toeprint will appear approximately correctly in the digitized image. However, the edges of the fingerprint/toeprint—which are located on those parts of the surface furthest away from the photographic objective and are slightly inclined, or even parallel to the axis of the latter—will appear with a very pronounced perspective (compression effect) and the topology of the characteristic points is greatly falsified, or indeed the characteristic points are no longer detectable. In this case, detection of the characteristic points has to be limited to the central region of the image of the print, which greatly impairs the reliability of the identification process.

To give an idea, the following example may be considered. A curvilinear rectangular image on a cylindrical surface of revolution is projected onto a plane surface as a plane rectangular image. The distortion of the plane rectangular image relative to the curvilinear rectangular image depends on the angular position of the regions of the image on the cylinder. Taking the simplest assumption of a straight projection:

the generatrix of the cylinder parallel to the plane and closest to the latter (the 0° angular position) is projected onto the plane without any distortion;

the curved region of the cylinder extending over the 0-45° angular range is projected onto the plane surface with a distortion of about 10%;

the curved region of the cylinder extending over the 0-65° angular range is projected onto the plane surface with a distortion of about 20%; and the curved region of the cylinder lying over the 0-85° angular range is projected onto the plane surface with a distortion of about 33%.

It should be emphasized that this is the overall distortion calculated from the ratio of the length of the circular arc to the length of its orthogonal projection on a plane. However, locally the distortion may be much higher.

It should also be noted that an image projected onto a plane (a photograph) of a fingerprint/toeprint affixed to a curved surface cannot be easily exploited in a reliable manner if the curved object on which the original fingerprint/toeprint is found has a diameter of less than 3.20 cm.

However, when the flat projected image has a distortion of less than 10%, automatic fingerprint/toeprint recognition machines can operate correctly.

Considered in another way, the transformation of the original fingerprint/toeprint affixed to the curved surface into a plane digital image results in a loss of resolution on said plane image that depends on the lateral distance from the undistorted central region. Again taking the example of a cylindrical surface of revolution, the variation in resolution on the plane image as a function of the angular position on the cylindrical surface is as follows:

1000 dpi at 0° (central region);
700 dpi at 45°;
500 dpi at 60°;
173 dpi at 80°; and
0 dpi at 90°.

There therefore exists a pressing demand, on the part of those using automated fingerprint/toeprint recognition devices, for this automated recognition to remain valid and exploitable even in the presence of fingerprints/toeprints affixed to curved surfaces, in such a way that at least most of the characteristic points of the prints can be detected and used for recognition purposes.

For this purpose, the invention proposes an identification method as mentioned in the preamble, which is characterized, according to the invention, in that, when the fingerprint/toeprint is on a curved surface, said digitized image is transformed into a corrected digitized image, with a distortion level below a predetermined threshold, by projecting it onto a plane by means of algorithm processing, said corrected image showing the characteristic points of said fingerprint/toeprint in a plane, in that said characteristic points in said corrected image are detected and in that the current digital data of said characteristic points is exchanged with the abovementioned data bank and compared with the digital data stored in said data bank.

Thanks to this method, the initial plane digitized image of the fingerprint/toeprint, which was only partly exploitable and often resulted in unsatisfactory results (insufficient number of visible characteristic points, distorted distances between the characteristic points leading to erroneous topologies, resulting in erroneous or impossible identifications), is transformed into a corrected plane digitized image on which the topology of the characteristic points of the print is reconstructed with an exactitude very much greater than that of the initial image. The exactitude of this topology in the reconstructed image is further improved and nearer to the exact topology when the geometry of the curved surface has been taken into account in a precise manner by the algorithm processing means.

Thus, the best results are obtained in particular when the curved surface is a simple geometrical surface—a cylindrical surface of revolution, a conical or frustoconical surface of revolution or possibly a spherical surface—and when diametrically opposed points or generatrices are visible on the initial image (semicylinder, semicone or hemisphere visible on projection on the initial image).

If the fingerprint/toeprint is affixed to a complex curved surface, the aim is to break down said surface into surface elements of simple geometrical shapes that are juxtaposed, and each surface element with its print portion is processed individually, thereby resulting finally in a corrected plane image formed from a mosaic of corrected plane image elements which are juxtaposed with greater or lesser precision depending on the complexity of the cutting operation, but which allows the automated recognition process to be implemented, whereas the initial plane image could not have been correctly processed.

The method according to the invention therefore consists in "unrolling" the initial image of the fingerprint/toeprint so as to be flat, while respecting the distances of the various regions or points relative to an undistorted reference region. In other words, the plane distances equal to the respective curvilinear distances on the surface to which the print is affixed are transferred onto the corrected plane image. Only the edge regions (corresponding to the edges of the curved surface) cannot be effectively reconstructed because of the shape compression due to the perspective effect. However, these nonreconstructable edge regions remain of little importance, and it is estimated that about 83% of the plane image of the print can be corrected.

The invention will be more clearly understood on reading the detailed description that follows, given with reference to the appended drawings in which.

The object of the invention is to process the case of fingerprints/toeprints detected on a curved surface so that these images can be exploited by automated recognition or identification devices which process plane topologies of characteristic points of fingerprints/toeprints.

The process starts by taking (at 11 in FIG. 3) a digital photograph of the fingerprint/toeprint or partial fingerprint E present on a curved surface 12. This digital photograph can be taken by any known means, either directly, or by digitization of a standard photograph. To obtain results of optimum quality, it is desirable for the photograph to be taken while minimizing perspective effects. For example, in the case of cylindrical or conical surfaces of revolution, the axis of the objective is if possible perpendicular to the axis of the surface and directed approximately on the center of the print or partial print.

Figure 1A:
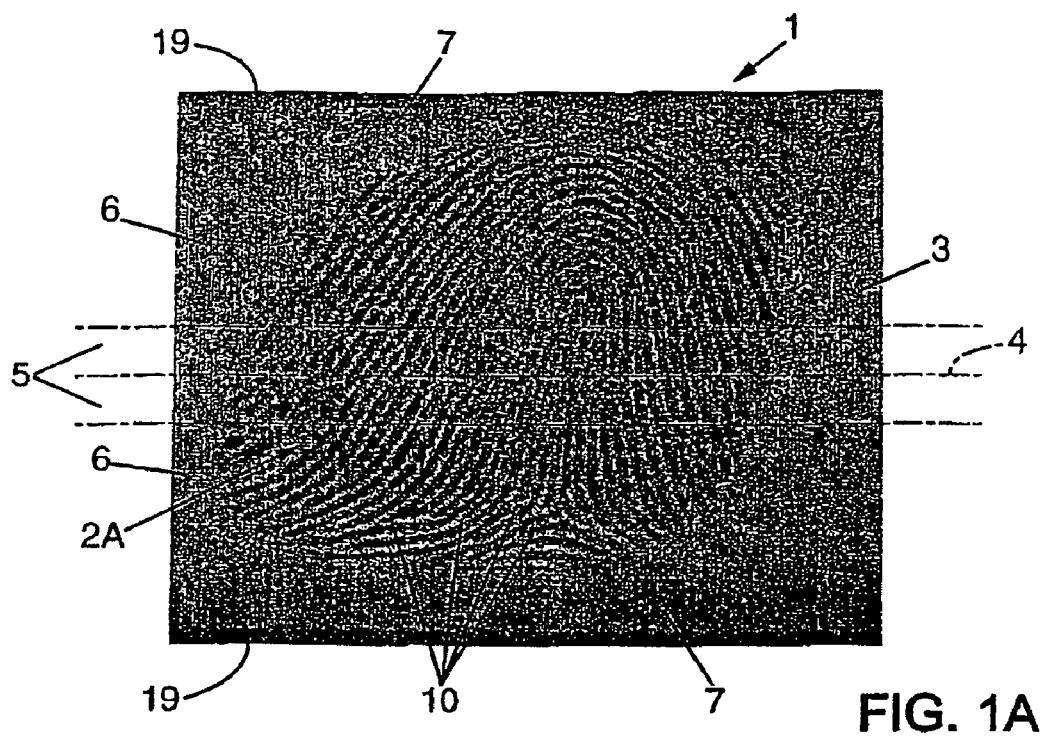
FIGS. 1A and 1B are plane images of a fingerprint affixed to a cylindrical surface of revolution, these images being uncorrected and corrected by implementing the method of the invention, respectively.
Figure 3:
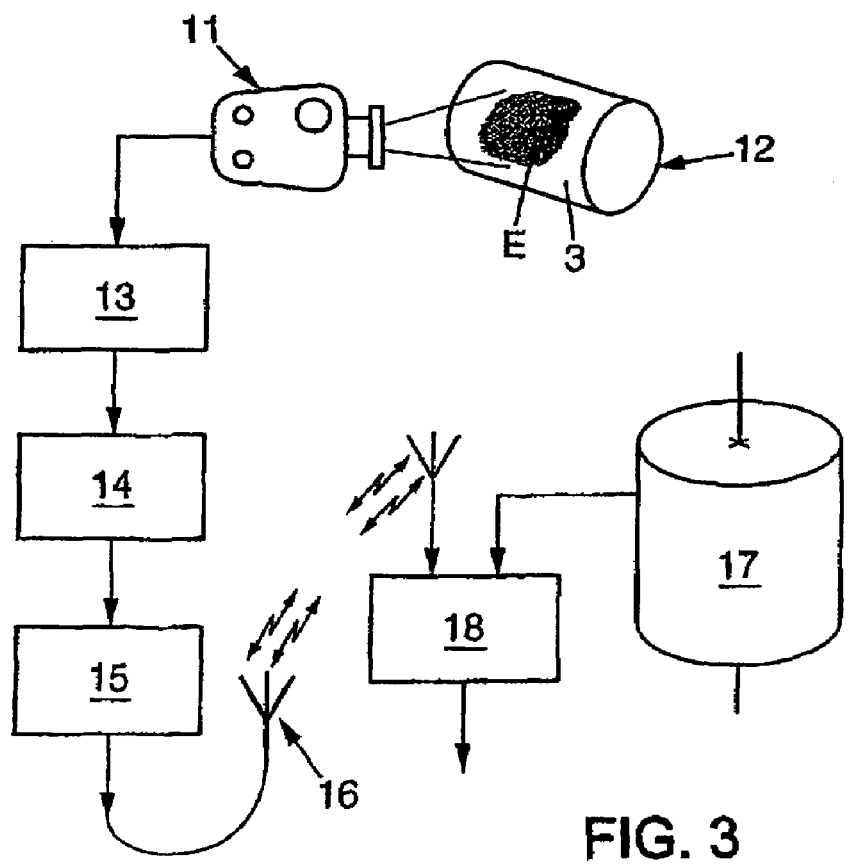
FIG. 3 is a highly simplified diagram illustrating the fingerprint recognition identification process in accordance with the invention.

The example illustrated in FIG. 1A represents a digital photograph 1 showing a digitized image 2A of a fingerprint E present on a curved surface 3 of an object 12 (FIG. 3).

The preferential field of application of the invention relates to police work: the objects on which fingerprints are detected (excluding on furniture, walls, doors—i.e. plane surfaces for which the automated identification process is usually carried out) may frequently be curved surfaces of simple geometry (a cylinder, a cone or truncated cone, or a sphere). In particular, prints may be detected on firearm barrels or on firearm munition cases, which have cylindrical surfaces of revolution, on door handles of rooms or vehicles, which have surfaces or surface portions that are cylindrical surfaces of revolution or conical surfaces of revolution, etc. To take an example, the curved surface 3 shown in FIG. 1A is a cylindrical surfaces of revolution.

When the camera has been positioned as mentioned above, the digitized image 2A (FIG. 3) of the fingerprint/toeprint is obtained at 13, which has no appreciable distortion along the generatrix 4 that coincides with the axis of the cylinder, which has limited distortion in the regions 5 lying on either side of the generatrix 4 (angular regions from 0 to about 45° in which the distortion remains less than about 10%), and which finally has a significant distortion, increasing toward the edges, in the outermost regions 6, with shape compression, making them illegible along the visible edges 7 of surface 3 (FIG. 1A). In this example, the visible edges of the surface 3 are bounded by two diametrically opposed generatrices 19.

The method of the invention is carried out (step 14 in FIG. 3) on the digital image thus obtained, which consists in transforming said digitized image 2A into a corrected digitized image, with a distortion level below a predetermined threshold, by projecting it onto a plane by means of algorithm processing, said corrected image representing, in a plane, the characteristic points of said fingerprint/toeprint. In other words, the curved initial image is "unrolled" onto a plane in order to obtain an "unrolled" final image.

The algorithm processing is carried out as follows, explained with reference to FIG. 2.

Figure 2:
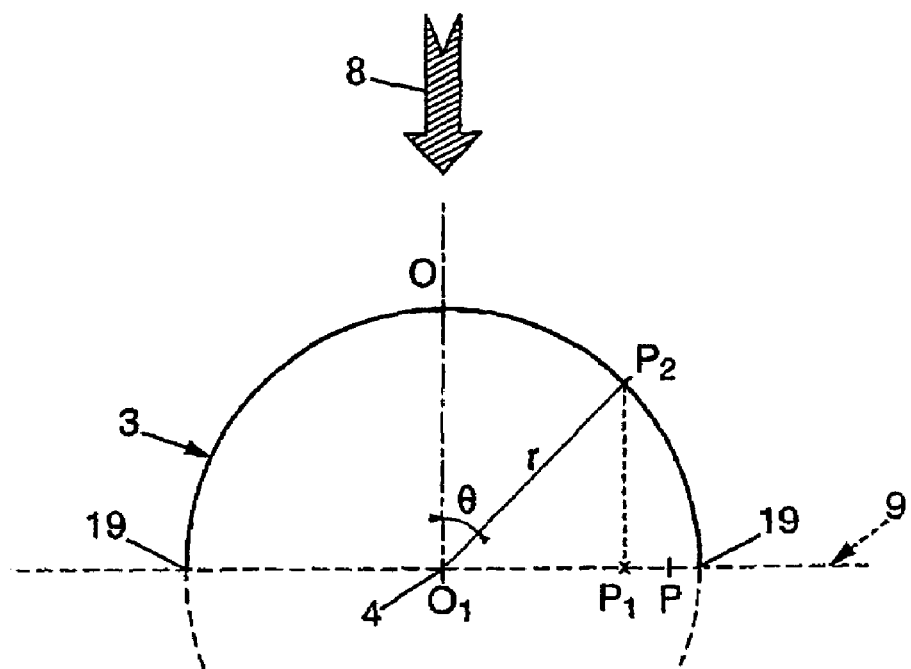
FIG. 2 is a diagram illustrating the image correction procedure implemented in accordance with the invention.

FIG. 2 shows the cross section of the surface 3 (for example a cylinder of revolution) only in its part appearing in the photograph (the camera axis is indicated by the arrow 8). The digitized image 2A of the fingerprint corresponds to the projection of the print, wrapped around the curved surface 3, onto the plane 9, i.e. the diametral plane perpendicular to the camera axis 8.

In this projection, the middle O of the curved surface 3 is projected onto $O_1$, the middle of the diameter and corresponding to the axis 4 of FIG. 1A. The projection of O onto $O_1$ is effected without any distortion.

Any point $P_2$ on the curved surface 3 (does not coincide with the middle O) is projected onto the diameter at $P_1$.

If the radius of the cylindrical surface 3 is denoted by r and the angle between the segment $O_1P_2$ and the segment $OO_1$ is denoted by η, the length of the curvilinear segment $OP_2$ on the surface 3 is:

$$OP_2 = r\theta \text{ (θ in radians)}$$

and is greater than the length of its straight projection (the linear segment $O_1P_1$) on the plane 9, which is:

$$O_1P_1 = r\cos(\pi/2 - \theta) \text{ (θ in radians)}$$

i.e.

$$O_1P_1 = r\cos(\pi/2 - OP_2/r)$$

It is therefore possible to consider algorithm processing that establishes an association between any point $P_2$ in the initial digitized image 2A and a point P in the plane 9, such that:

length $OP_2$=segment length $O_1P$.

In practice, the algorithm processing is carried out in the reverse direction, so as to discover, for any point P in the plane 9, the corresponding point $P_2$ in the initial digitized image 2A. Thus, more precisely, the algorithm processing determines, for any point P in the plane 9, a point $P_1$, such that:

$O_1P_1 = r \cos(\pi/2 - O_1P/r)$.

The point $P_1$ thus found is the projection of a point $P_2$ of the cylindrical surface 3 that satisfies the required relationship: arc length $OP_2$=segment length $O_1P$.

To perform this algorithm processing requires knowing the value of the radius r of the curved surface 3 and of the position of the point $O_1$.

This information can be determined in a simple manner in the case, envisaged in FIGS. 1A and 2, in which the curved surface 3 is of simple shape and in which two diametrically opposed generatrices are visible in the digitized image (the image then presents a semicylinder, as visible in FIG. 1A). For this purpose, it is possible to identify, in the digitized image, two points on each of the two diametrically opposed generatrices (the visible edges of the surface). The algorithm processing is then capable of determining the diameter of the surface and of positioning its axis. The algorithm processing of each point in the digitized image is thus possible.

The same process would be applicable in the case of a conical surface of revolution.

In the case of a cylindrical surface of revolution, knowing three points (two on one generatrix and one on the diametrically opposed generatrix), or else knowing one point on one generatrix and the position of the axis of the surface, or else knowing two points on one generatrix and one point on the axis, may suffice for authorizing the algorithm processing. In the case of a conical or frustoconical surface of revolution, knowing four points (two points on each of the two diametrically opposed generatrices) is necessary.

It should also be noted that the algorithmic processing of the points on the edges of the initial digitized image admittedly does allow corrected points to be obtained in relation to the visible points on the initial image, but does not allow reconstruction of what is not visible, owing to the shape compression due to the perspective effect. In particular, characteristic points present in these edge regions cannot be detected and therefore do not appear in the corrected image. Owing to the scarcity of information that can be collected along the edges because of the deformations due to the overly substantial perspective effect, it may be appropriate not to process data from the edge regions, thereby speeding up the formation of the corrected image.

Algorithm processing covering about 83% of the initial image seems to be satisfactory.

Figure 1B:
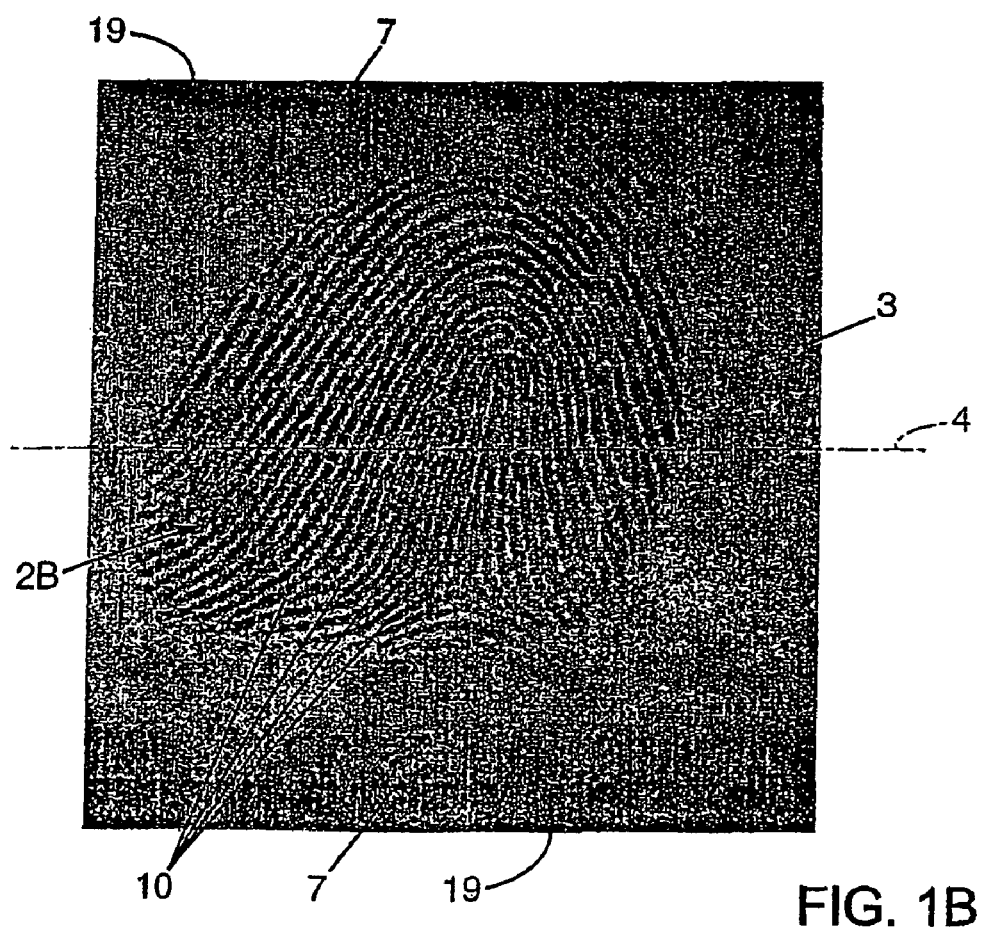

The algorithm processing thus carried out on the initial digitized image 2A of the fingerprint/toeprint results in a corrected ("unrolled") digitized image 2B as may be seen in FIG. 1B. This corrected image exhibits a topology of the characteristic points 10 of the fingerprint/toeprint which no longer has the errors due to the straight projection of a three-dimensional image onto a plane surface. Consequently, the characteristic points are at their relative approximately exact positions and it becomes possible to analyze them over the entire image.

Thus, the automated identification process is carried out on the corrected digitized image of the fingerprint/toeprint and it is this corrected digitized image of the fingerprint/toeprint that is analyzed (at 15, FIG. 3) in order to detect in said image the characteristic points lying within an approximately exact plane topology.

It is the current digital data of said characteristic points lying within a plane topology that are then exchanged (at 16, FIG. 3) with a data bank (17, FIG. 3) storing digital data of the characteristic points of a multiplicity of fingerprints/toeprints in its memory, said stored digital data corresponding to plane images of the multiplicity of fingerprints/toeprints.

It then becomes possible to make a reliable comparison between the digital data of the abovementioned detected characteristic points with the digital data stored in memory in the data bank in order to attempt to identify a person possessing said fingerprint/toeprint left on the curved surface (18, FIG. 3).

Figure 4A:
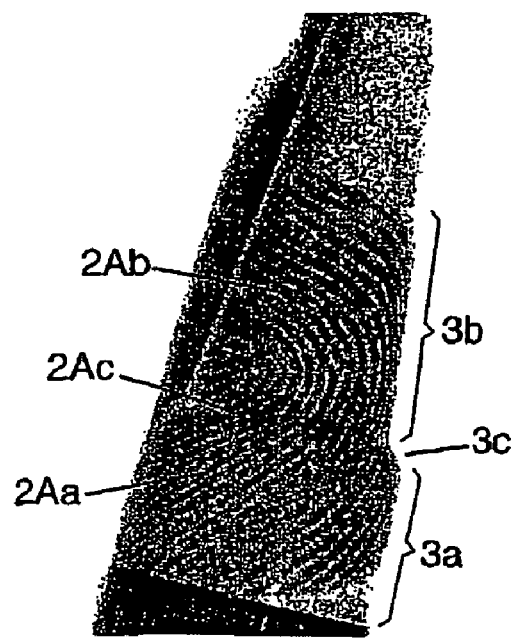
FIGS. 4A and 4B are plane images of a fingerprint, before and after processing according to the invention respectively, the surface having a complex shape.
Figure 4B:
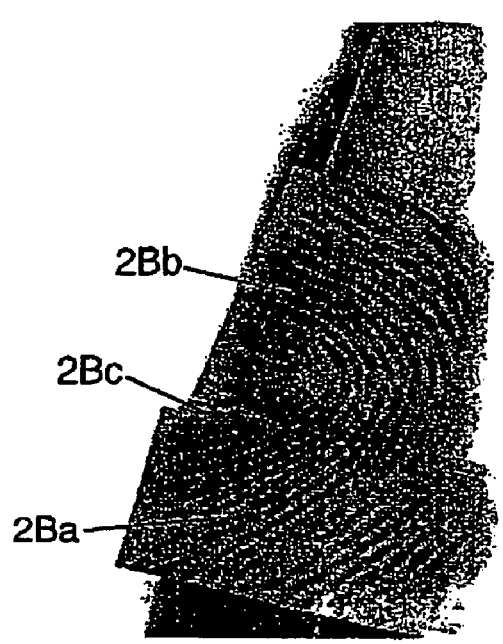

The precision of the reconstruction of the plane topology of the characteristic points of the fingerprint/toeprint left on a curved surface depends essentially on the conditions under which the fingerprint/toeprint has been photographed, on the one hand, and on the reconstruction of the geometry of the surface, on the other. The reconstruction of the geometry of the surface involves reconstructing as faithfully as possible the shape of the surface, which can be readily achieved in the case of simple shapes (a cylinder or cone of revolution, or a sphere), but is more difficult to achieve in the case of less simple shapes (a cylinder or cone not of revolution for example) or in the case of complex shapes. It is then necessary to break down the complex shape into simple elementary shapes and the final corrected image is then formed from a mosaic of corrected elementary images showing respective portions of the fingerprint/toeprint. FIGS. 4A and 4B illustrate such a process. As can be seen in FIG. 4A, the fingerprint/toeprint 2A is photographed on an article of complex curvilinear shape which, in this example, is broken down into a cylindrical surface of revolution 3a comprising a portion 2Aa of the image of the fingerprint/toeprint, a frustoconical surface of revolution 3b comprising a portion 2Ab of the image of the fingerprint/toeprint and a surface 3c connecting the two previous surfaces in the form of a rounded annular shoulder and comprising a portion 2Ac of the image of the fingerprint/toeprint. Each surface is processed independently of each other, employing, for each of them, the abovementioned provisions. Finally, three juxtaposed corrected images, 2Ba, 2Bb and 2Bc respectively, are obtained (FIG. 4B).

The exact determination of the radius of the surface must also be specified as it is this that determines the "unrolling" of the image. To do this, it is necessary for the points determining the generatrix or generatrices and/or the axis of the surface on the initial image to be identified as precisely as possible.

From this point of view, the optimum conditions are encountered when the curved surface appears in the photograph in a diametrically cut form, with its edges 19 bounded by two diametrically opposed generatrices.

If the curved surface does not appear in diametrically opposed form, it is possible to envisage supplying the algorithm processing means manually with information about the shape and the radius of the surface, for example by using a digital design software, making it possible to draw, on the initial image, a length of arc according to the cross section of the curved surface, from which length of arc the algorithm processing means would be capable of determining the radius of curvature.

The invention claimed is:

1. A method of identifying a person by fingerprint/toeprint recognition, comprising the steps of:
   producing a digital photograph having a digitized image of a fingerprint/toeprint or part of a fingerprint/toeprint present on a surface of an object;
   analyzing said digitized image of the fingerprint/toeprint;
   detecting characteristic points of the fingerprint/toeprint in the digitized image;
   exchanging detected digital data of the detected characteristic points with a data bank in which digital data of the characteristic points of a multiplicity of fingerprints/toeprints are stored in a memory, said stored digital data corresponding to plane images of the multiplicity of fingerprints/toeprints;
   comparing the detected digital data of the abovementioned detected characteristic points with the digital data stored in the memory of the data bank; and
   identifying a person having said fingerprint/toeprint as a result of the above comparing step,
   said method further comprising, where the fingerprint/toeprint is present on a curved surface, the steps of
   selecting a pre-established model of a curved semicylindrical or semiconical surface of revolution having a shape corresponding or close to a shape of the curved surface or of a portion of the curved surface on which the fingerprint/toeprint is present,
   sending information about respective positions of two diametrically opposed generatrices of the curved surface which are visible in the digitized image to an algorithm processing device, whereby the algorithm processing device deduces from the information relevant geometrical characteristics of the curved surface, and
   transforming, using the algorithm processing device for a plane projection, the digitized image into a corrected digitized image with a distortion level below a predetermined threshold, said corrected digitized image showing the characteristic points of said fingerprint/toeprint in a plane,
   whereby said corrected digitized image is used for detecting the characteristic points of the fingerprint/toeprint in the detecting step and for identifying the person in the indentifying step.

2. The method as claimed in claim 1, wherein the transforming step includes the step of associating, by use of the algorithm processing device, each point in the digitized image of the curved fingerprint/toeprint present on the curved surface with a projected point lying in a projection plane such that the linear distance of said projected point in the projection plane relative to the projection of the axis of said curved surface is equal to the curvilinear distance of the point in the digitized image relative to the projection of said axis onto said curved surface.

3. The method as claimed in claim 2, wherein said transforming step includes, at any point P in the projection plane, determining with the algorithm processing device a projected point $P_1$ such that:

$$O_1 \cdot P_1 = r \cdot \cos(\pi/2 - O_1 \cdot P/r)$$

where $O_1$ is the projection of the axis of the curved surface onto said projection plane, and
   where r is an estimated radius of the curved surface, and then associating the projected point $P_1$ in the plane with a point $P_2$ on the curved surface such that the projected point $P_1$ is the projection of the point $P_2$ on the projection plane.

4. The method as claimed in claim 1, where the fingerprint/toeprint present on a surface of complex shape,
   wherein said transforming step includes the steps of
      breaking the digitized image of said surface of complex shape down into partial images of surfaces of simple shape,
      processing each partial image in relation to the shape of the respective surface in order to obtain corrected partial images, and
      juxtaposing the corrected partial images so as to obtain a corrected full image of the fingerprint/toeprint like a mosaic.

* * * * *

UNITED STATES PATENT AND TRADEMARK OFFICE
CERTIFICATE OF CORRECTION

PATENT NO.      : 7,596,248 B2
APPLICATION NO. : 10/533964
DATED           : September 29, 2009
INVENTOR(S)     : Cova et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1179 days.

Signed and Sealed this

Twenty-eighth Day of September, 2010

David J. Kappos
*Director of the United States Patent and Trademark Office*